(12) United States Patent
Kemmler (10) Patent No.: US 7,853,925 B2
(45) Date of Patent: Dec. 14, 2010

(54) SYSTEM AND METHOD FOR MANAGING HIERARCHICAL SOFTWARE DEVELOPMENT

(75) Inventor: Andreas Kemmler, Bonnigheim (DE)

(73) Assignee: SAP AG, Walldorf (DE)

( * ) Notice: Subject to any disclaimer, the term of this patent is extended or adjusted under 35 U.S.C. 154(b) by 1035 days.

(21) Appl. No.: 11/610,325

(22) Filed: Dec. 13, 2006

(65) Prior Publication Data

US 2008/0148230 A1 Jun. 19, 2008

(51) Int. Cl.
G06F 9/44 (2006.01)

(52) U.S. Cl. .................. 717/120; 717/106; 717/107; 717/108; 717/122

(58) Field of Classification Search .................. 717/120
See application file for complete search history.

(56) References Cited

U.S. PATENT DOCUMENTS

| | | | | |
|---|---|---|---|---|
| 5,960,200 | A * | 9/1999 | Eager et al. | 717/147 |
| 6,745,041 | B2 * | 6/2004 | Allison et al. | 455/466 |
| 7,072,906 | B2 | 7/2006 | Kemmler | |
| 7,228,548 | B1 * | 6/2007 | Aldrich et al. | 719/310 |
| 2003/0074648 | A1 * | 4/2003 | Brassard et al. | 717/104 |
| 2003/0120675 | A1 * | 6/2003 | Stauber et al. | 707/100 |
| 2004/0205754 | A1 * | 10/2004 | Gazda et al. | 718/100 |
| 2005/0262473 | A1 * | 11/2005 | Kocka | 717/105 |
| 2006/0161768 | A1 * | 7/2006 | Baissus et al. | 713/152 |
| 2007/0067753 | A1 * | 3/2007 | Pocklington et al. | 717/104 |
| 2007/0168925 | A1 * | 7/2007 | Bornhoevd et al. | 717/104 |
| 2007/0240108 | A1 * | 10/2007 | Dorn et al. | 717/114 |

* cited by examiner

*Primary Examiner*—Thomas K Pham
(74) *Attorney, Agent, or Firm*—Fish & Richardson P.C.

(57) ABSTRACT

The disclosure provides systems, methods, and software for facilitating hierarchical software development. One solution comprises software operable to identify a first software package of a first software layer that is associated with a second software package of a second software layer. The software creates a temporary package interface for the second software package, the temporary package interface allowing the first software package to access one or more objects within the second software package. Such software can be further operable to delete the temporary package interface after the first software package has been moved away from the first software layer to a different software layer. The software may be still further operable to assign the objects to the temporary package interface of the second package. Moreover, the temporary package interface could be operable to authenticate the first software package prior to allowing the first software package to access the objects.

21 Claims, 5 Drawing Sheets

SYSTEM AND METHOD FOR MANAGING HIERARCHICAL SOFTWARE DEVELOPMENT

TECHNICAL FIELD

This disclosure relates to software development and, more particularly, to a system and method for managing or otherwise facilitating hierarchical software development.

BACKGROUND

In recent years, the tremendous growth in the computational power of computers has enabled software to become ever more complex. The increasing size and scope of software development projects can lead to situations where software development projects undertaken in one software layer may depend on, be used by, or be used for other software layers. In some situations, development projects may be undertaken in upper software layers in order to enhance functionality in lower software layers. These development projects often depend on access to objects contained in lower software layers, yet because the development projects are undertaken in upper software layers, errors may occur when the development projects attempt to access these objects since the projects and objects are found on different levels.

SUMMARY

The disclosure provides systems, methods, and software for managing or otherwise facilitating hierarchical software development. For example, software operable when executed to identify a first software package of a first software layer that is associated with a second software package of a second software layer. The software creates a temporary package interface for the second software package, the temporary package interface allowing the first software package to access one or more objects within the second software package. Such software can be further operable to delete the temporary package interface after the first software package has been moved from the first software layer to a different software layer. This deletion typically prevents other software packages from accessing the temporary package interface and thereby gaining access to the object. The software may also be operable to assign the objects to the temporary package interface of the second package, such that outside software packages may access objects of the second package that were assigned to a temporary package interface of the second package. In some cases, the temporary package interface authenticates the first software package prior to allowing the first software package to access the one or more objects. This authentication could occur by checking to see if the first software package is on an access control list, a list of packages that may access the temporary package interface and its associated objects. As a result of such authentication and assignment procedures mentioned above, only particular software packages, if any, may access specific objects contained in the second software package.

The details of these and other aspects and embodiments of the disclosure are set forth in the accompanying drawings and the description below. For example, each of the foregoing—as well as other disclosed—example methods and techniques may be computer implementable. Moreover, while generally described or referenced in terms of an enterprise, the components and techniques may be implemented in any suitable environment, organization, entity, and such. Further, the structures of a client package and a server package may be substantially identical. For example, both packages could have different, but often have similar, structures/hierarchies, such as having three levels with the outer two levels only containing other packages and the inner third level containing objects that could be accessed by outside applications, each of the three levels having one or more associated package interfaces. Certain features, objects, and advantages of the various embodiments will be apparent from the description, drawings, and claims.

DETAILED DESCRIPTION

Figure 1:
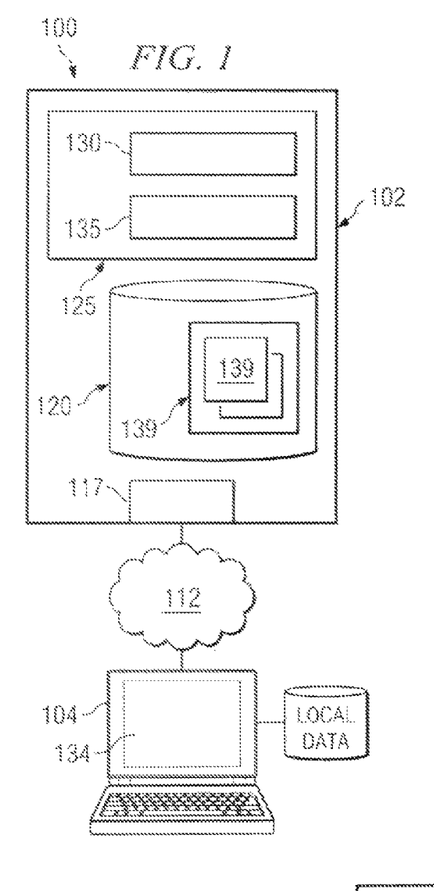
FIG. 1 illustrates an example system for developing software and for solving errors that may occur when software packages attempt to access objects contained in other software packages in accordance with one embodiment of the present disclosure.

FIG. 1 illustrates an example system 100, part of which is often implemented within an enterprise, for developing software in accordance with one embodiment of the present disclosure. As will be described in further detail, the software development process may involve software packages or applications (such as development application 135) that seek access to development objects contained in other software packages (such as software packages 139), often across various software layers. For example, development of packages may occur in various add-on systems based on a stack. In many cases in this example, such add on development projects are then retrofitted into the stack as they are completed. Further, the objects created in the add-on system often use or refer to objects from the underlying stack. Specifically, the provider portion (or stack layer) offers certain objects (in package interfaces) and the consumer portion (or add-on layer) declares a usage access. In other words, the development done in the add-on system is often an enhancement of existing functionality that is done (for various reasons) in the particular add-on system instead of in the stack. This split of development objects that semantically belong together and that might have been developed under normal conditions in the same (main) development package often leads to the stack part and the add-on part having no linkage. This generally means that the common usage permissions are missing for the objects in the add-on layer to use or refer to objects in the stack; specifically, in some cases, when some parts of the stack layer are not prepared to be a basis component of upper layers, various package check violations (package errors)

may occur in the add-on system that can restrict and delay the development process in the add-on system.

In one embodiment of the present disclosure, temporary package interfaces provide a solution to certain problems that may arise when the software packages or applications seeking access to the development objects are not located on the same software layer as the packages containing the development objects. These temporary package interfaces may be created by development software or by a user (such as client 104 operating GUI 134) communicating with the development packages or applications through a network (such as network 112). In certain situations, such techniques may increase the speed of project development, decrease its costs, and/or reduce the dependence of developers on ad hoc solutions.

System 100 is typically a distributed client/server system that spans one or more networks such as 112. In such embodiments, data may be communicated or stored in an encrypted format using any standard or proprietary encryption algorithm. But system 100 may be in a dedicated enterprise environment—across a local area network or subnet—or any other suitable environment without departing from the scope of this disclosure. Turning to the illustrated embodiment, system 100 includes or is communicably coupled with server 102, one or more clients 104, and network 112.

Server 102 comprises an electronic computing device operable to receive, transmit, process and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Illustrated server 102 includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes software packages 139 that may be used or referenced by development application 135 or business application 130. At a high level, software packages 139 may be used to develop software applications, composite applications, programs, modules, processes, or other software that will be incorporated into application 130 or memory 120. In certain implementations, software packages 139 have development objects and/or package interfaces associated with them. Moreover, software packages 139 may be found in one or more different software layers that may be local or remote from one another. Indeed, while illustrated as resident within memory 120, such software packages 139 may be transitive or permanent and may be logical or physically stored utilizing any particular format and media. These details and others will be discussed further in reference to FIGS. 3 through 6.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes application 130 and development application 135.

Figure 2:
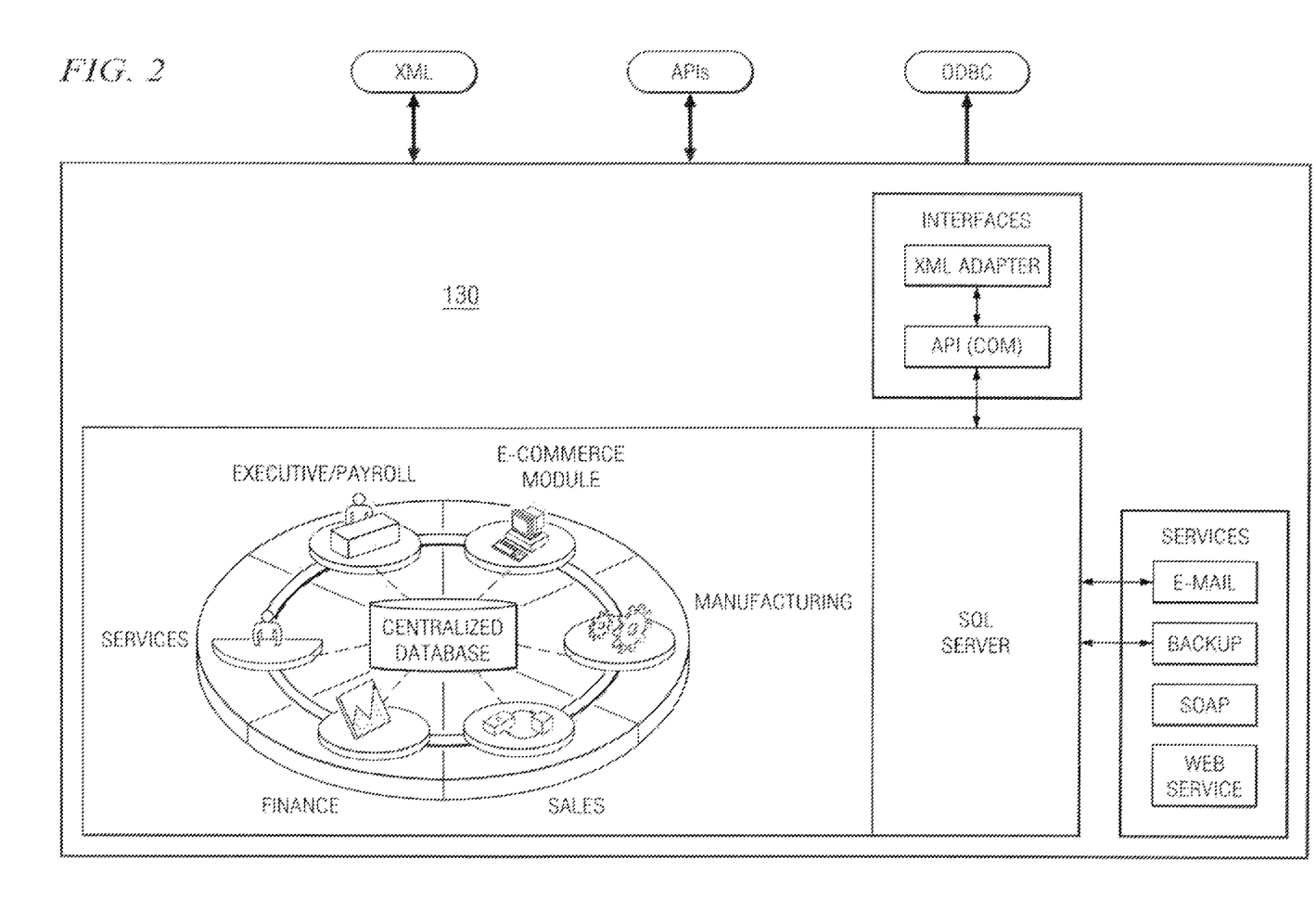
FIG. 2 illustrates an example application implementing a number of application services, such as customer relationship management systems, human resources management systems, financial management systems, project management systems, knowledge management systems, and electronic file and mail systems.

Generally, development application 135 is any application, composite application, program, module, process, or other software used to develop software applications, composite applications, programs, modules, processes, or other software, which will be incorporated into application 130 or memory 120, such as software packages 139. For example, development environment 135 may comprise a development studio, a modeling tool, or some other environment that facilitates the creation or management of software packages 139. Moreover, development application 135 may reside, in whole or in part, in different software layers than certain software packages 139. At a high level, application 130 is any application, program, module, process, or other software that is capable of being changed, updated, upgraded, communicated with, or processed using software packages 139. In certain cases, system 100 may implement a composite application 130, as described below in FIG. 2. Regardless of the particular implementation, "software" may include software, firmware, wired or programmed hardware, or any combination thereof as appropriate. Indeed, application 130 and development application 135 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 130 is illustrated in FIG. 2 as including various sub-modules, application 130 may include numerous other sub-modules or may instead be a single multi-tasked module that implements the various features and functionality through various objects, methods, or other processes. Further, while illustrated as internal to server 102, one or more processes associated with application 130 or development application 135 may be stored, referenced, or executed remotely. For example, a portion of application 130 may be a web service that is remotely called, while another portion of application 130 may be an interface object bundled for processing at remote client 104. Moreover, application 130 may be a child or sub-module of another software module or enterprise application (not illustrated) without departing from the scope of this disclosure. Indeed, application 130 may be a hosted solution that allows multiple parties in different portions of the process to perform the respective processing.

More specifically, as illustrated in FIG. 2, application 130 may be a composite application, or an application built on other applications, that includes an object access layer (OAL) and a service layer. In this example, application 130 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 130 may run on a heterogeneous IT platform. In doing so, composite application may be cross-functional in that it may drive business processes across different applications, technologies, and organizations. Accordingly, composite application 130 may drive end-to-end business processes across heterogeneous systems or sub-systems. Application 130 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 130, it may instead be a standalone or (relatively) simple software program. Regardless, application 130 may also perform processing automatically, which may indicate that the appropriate processing is substantially performed by at least one component of system 100. It should be understood that this automatically further contemplates any suitable administrator or other user interaction with application 130 or other components of system 100 without departing from the scope of this disclosure.

Returning to FIG. 1, server 102 may also include interface 117 for communicating with other computer systems, such as clients 104, over network 112 in a client-server or other distributed environment. In certain embodiments, server 102 receives data from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.11n, 802.20, WiMax, and many others. While illustrated as a single or continuous network, network 112 may be logically divided into various sub-nets or virtual networks without departing from the scope of this disclosure, so long as at least a portion of network 112 may facilitate communications between server 102 and at least one client 104. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any computing device operable to connect or communicate with server 102 or network 112 using any communication link. At a high level, each client 104 includes or executes at least GUI 134 and comprises an electronic computing device operable to receive, transmit, process and store any appropriate data associated with system 100. It will be understood that there may be any number of clients 104 communicably coupled to server 102. Further, "client 104," "developer," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with an external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 134. Both the input device and output device may include fixed or removable storage media such as a magnetic computer disk, CD-ROM, or other suitable media to both receive input from and provide output to users of clients 104 through the display, namely the client portion of GUI or application interface 134.

GUI 134 comprises a graphical user interface operable to allow the user of client 104 to interface with at least a portion of system 100 for any suitable purpose, such as viewing application or other transaction data. Generally, GUI 134 provides the particular user with an efficient and user-friendly presentation of data provided by or communicated within system 100. GUI 134 may comprise a plurality of customizable frames or views having interactive fields, pull-down lists, and buttons operated by the user. GUI 134 may also present a plurality of portals or dashboards. In one embodiment of the present disclosure, discussed further in reference to FIG. 5, GUI 134 may enable a user to develop, examine, and/or use packages and package interfaces. It should be understood that the term graphical user interface may be used in the singular or in the plural to describe one or more graphical user interfaces and each of the displays of a particular graphical user interface. Indeed, reference to GUI 134 may indicate a reference to the front-end or a component of application 130, as well as the particular interface accessible via client 104, as appropriate, without departing from the scope of this disclosure. Therefore, GUI 134 contemplates any graphical user interface, such as a generic web browser or touch screen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

Figure 3:
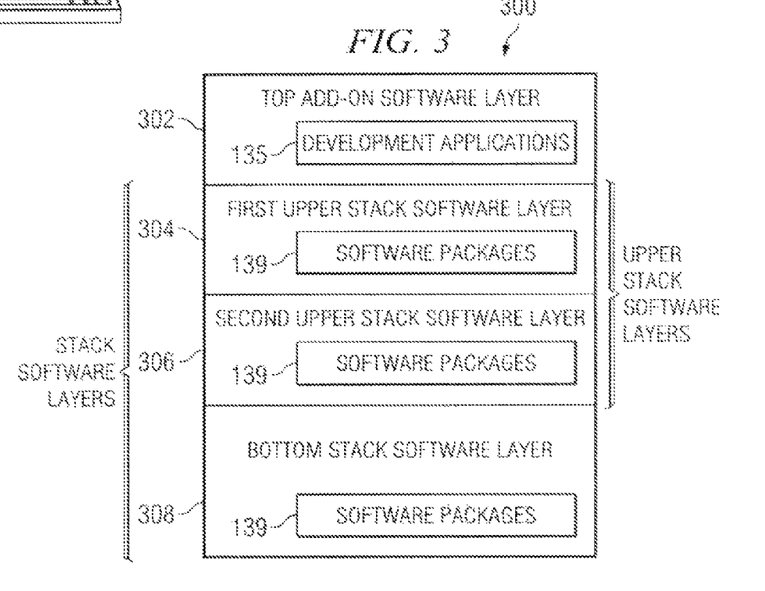
FIG. 3 illustrates an example hierarchy of software layers implemented by the system of FIG. 1.

Turning to an example of hierarchical software development, FIG. 3 shows a hierarchy of software layers 300. For example, one layer may contain development application 135 and another layer may contain the software packages 139. Lower software layers may offer development objects to software layers above them, while the topmost layers do not offer objects for use. For instance, the "bottom stack" layer 308 of FIG. 3 could offer objects to the "first upper stack" software layer 304 for use. As shown in FIG. 3, a "second upper stack" layer 306 could also exist that, like the first upper stack layer 304, could use or refer to objects offered up from the bottom stack layer 308. In the context of example FIG. 1, the software packages 139 could reside in the bottom stack layer 308, second upper stack layer 306, and/or first upper stack layer 304. If no software layers existed above these upper stack layers 304 and 306, then the upper stack layers 304 and 306 would usually not offer objects for use by other layers. It will be understood that reference to "upper," "top," "lower," "bottom," and so forth are general or illustrative references to a logical location or priority in a hierarchy and are not meant to limit the scope of the respective term. Other features that the hierarchy 300 depicted in FIG. 3 may provide include: (1) allowing objects from lower layers such as the bottom stack layer 308 to be hidden from upper layers; and (2) increasing the independence of the two upper stack layers 304 and 306 by restricting the components of these layers that have access to other objects or components of the upper stack layers 304 and 306. As will be described further in reference to FIGS. 4A-E, the process of offering and hiding development objects typically utilizes packages and package interfaces, as could be found in packages 139 of FIG. 1. For the purposes of this disclosure, "package interface(s)" may be of temporary duration as appropriate.

The top add-on layer 302, which in many cases may not offer objects to other layers, houses development projects in development applications such as development application 135. Such development projects may enhance, correct, or otherwise modify existing functionality in the bottom stack layer 308 or upper stack software layers 304 and 306, yet for various reasons, the development projects may be done in the top add-on software layer 302 rather than in the stack layers 304, 306, and 308 themselves. After the completion in the top add-on layer 302, the projects can be retrofitted into the underlying stack layers 304, 306, and 308 as necessary. Further, the projects may be retrofitted into any business application instead of or along with such retrofitting. For example, when the projects associated with development application 135 become completed, they can be retrofitted into business application 130 or memory 120.

The addition of the top add-on layer 302 may trigger modifications to the pre-existing stack layers and may change their role. Though previously they did not offer objects to other layers, the upper stack layers 304 and 306 might now be capable of offering up objects to the add-on layer 302 for development projects therein. In some cases, the dependence of the two upper stack layers 304 and 306 on each other may be limited so that system 100 might only use a specific part of the upper stack layers 304 and 306, thereby potentially reducing costs associated with maintenance, patching, and configuration. Although permanent packages and package interfaces could be used to enable the upper stack layers 304 and 306 to offer objects to the top add-on layer 302 (as will be apparent further on), this might create the possibility that other components of the upper stack layers 304 and 306 could access these package interfaces and their assigned development objects, even after the development projects were completed.

In some situations, system 100 may utilize temporary package interfaces to maintain or enhance such independence. These temporary package interfaces could exist while development projects in the top add-on layer 302 seek access to development objects in the upper stacks 304 and 306, yet be eliminated when no longer needed or based upon other factors such as memory use, security, profiles, bandwidth, and so forth. This may reduce the chance that the development objects could be accessed by other components of the upper stack layers 304 and 306 or top add-on layer 302.

Figure 4A:
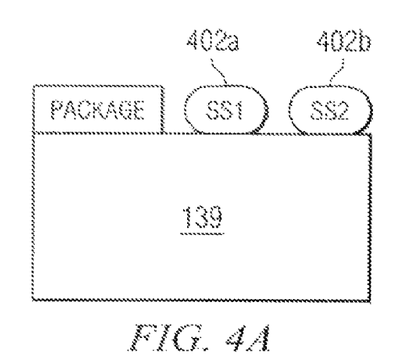
FIGS. 4A-E illustrate an example structure and function of certain packages and package interfaces in accordance with one embodiment of the disclosure.

An understanding of packages and package interfaces may be helpful for understanding temporary package interfaces and the offering/hiding of development objects to other applications or layers. FIG. 4A illustrates in more detail one package 139. Initially, nothing from the interior of the package is visible to applications or layers outside the package, as if the interior were a "black box." Though development objects inside the package are initially hidden from the outside, they are visible within the same package. Since a development object may need to be visible to an application in order for the application to use the object, it is useful to have a way of making development objects interior to a package visible to the outside. This can be done by using "package interfaces" 402a and 402b, also illustrated in FIG. 4A. The package interface is a set of development objects visible to the outside. Each package can have zero, one, or multiple package interfaces associated with it. In contrast, each package interface is usually associated with only a single package.

Figure 4B:
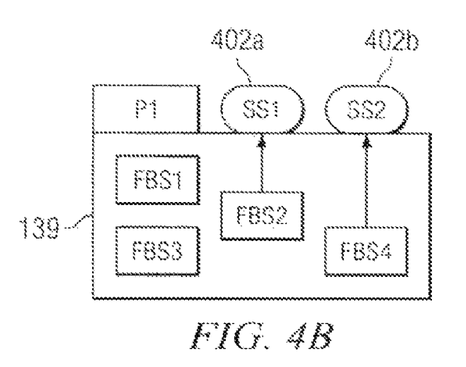

FIG. 4B shows a package and its package interfaces in more detail. Package P1 has package interfaces SS1 402a and SS2 402b. Development objects FBS2 and FBS4 are made visible to the outside by assigning them to package interfaces SS1 402a and SS2 402b, respectively. Because objects FBS1 and FBS3 have not been assigned to package interfaces, they are not visible to and normally cannot be used by applications outside Package P1. Though not shown in FIG. 4B, multiple objects may be assigned to the same package interface, and a single object may be assigned to multiple package interfaces of a package. For example, it would be possible for FBS2 and FBS4 to both be assigned to SS1 402a and to both be assigned to SS2 402b simultaneously.

Figure 4C:
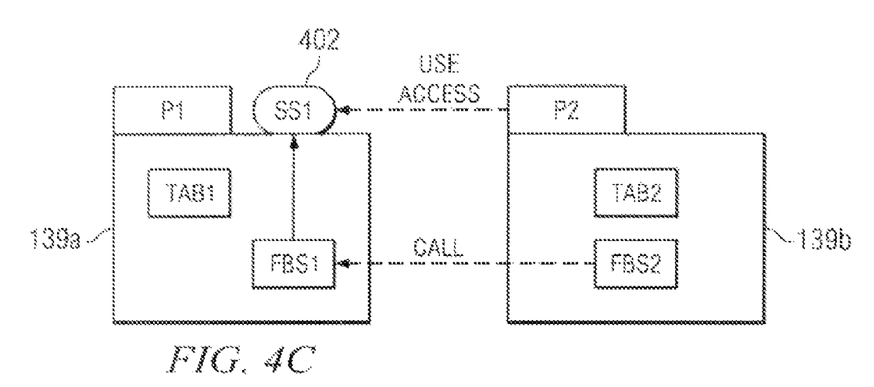

FIG. 4C shows that both visibility and use access may be needed in order for another package or application to access the objects of a different package. Package P1 139a has an object FBS1 that has been made visible to the outside, specifically to package P2 139b, by assigning it to package interface SS1 402. Note that Tab 1 has not been assigned to a package interface and, therefore, is usually not visible to package P2 139b. In order for FBS2 of package P2 139b to call FBS1, package P2 139b may need to be authenticated by getting use access to the package interface SS1 402. Without such use access, FBS2 typically cannot use or refer to FBS1, even though FBS1 is visible to the outside. Both visibility and use access are typically needed to allow usage by outside software packages; without both, usage by outside software packages would usually be denied. If a package such as P2 139b has use access to a package interface such as SS1 402, then package P2 139b may use all development objects assigned to or made visible by the package interface SS1 402.

Use access may have additional desirable features. First, FIG. 4C shows use access that is directed; package P2 139b has use access to package interface SS1 402, but package P1 139a does not have use access to any package interface of package P2 139b. In order for there to be two-way coupling between two packages, two use accesses are typically utilized. Second, in particular implementations, use access refers to only one package interface. Thus, in this example, although package P2 139b has use access to package interface SS1 402, it may not automatically have use access to any other package interfaces package P1 139a might have. Package P2 139*b* would then be required to have separate use access for each package interface of P1 139*a* with assigned objects package P2 139*b* desired to access. Third, it is possible to restrict use access to a package interface in advance by using an "access control list." In this case, those packages designated on the access control list have use access to the package interface, while others not on the list may have requested access denied. Often, the access control list for the package interface would be maintained in the respective package interface.

In some situations, insufficient use access of the client package can occur because of a simple omission to provide use access or because the client package was affirmatively forbidden from accessing the server package. Moreover, the error can occur when objects are either in the add-on layer 302 or in the stack layers 304, 306, and/or 308 of FIG. 3. If the object generating the error is in the add-on layer 302 and the error was due to an omission, the error can be solved by using corrective package interfaces and usage accesses. If the object generating the error is in one of the stack layers 304, 306, or 308 and is due to an omission, then a temporary interface may be generated or utilized as described herein.

Figure 4D:
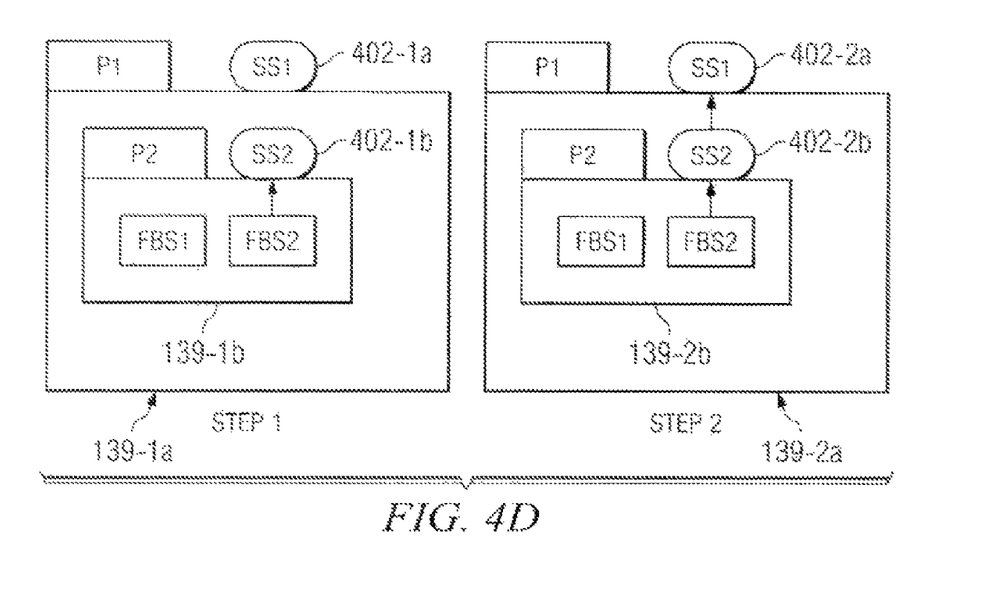

FIG. 4D shows that packages may be nested and pertains to the process of making objects in nested packages visible to the outside. The outer package P1 (139-1*a* and 139-2*a*) has a package interface SS1 (402-1*a* and 402-2*a*) and houses a second package P2 (139-1*b* and 139-2*b*). The package P2 has a package interface SS2 (402-1*b* and 402-2*b*) and contains objects FBS1 and FBS2. FBS1 is not assigned to a package interface and therefore is not visible outside of package P2. FBS2 has been assigned to package interface SS2 and is therefore visible to package P1. On the left side of FIG. 4D, FBS2 is not yet visible outside of package P1 139-1*a* since it has not been assigned to package interface SS1 402-1*a*. As the right side of FIG. 4D shows, FBS2 should not be directly assigned to package interface SS1 402-2*a*; FBS2 should first be assigned to a package interface of P2 (e.g. SS2 402-2*b*), after which this package interface of P2 (e.g. SS2 402-2*b*) should be assigned to a package interface of P1 (e.g. SS1 402-2*a*). Though FIG. 4D deals with the case of two layers of packages, the same process applies when there are more than two layers of nested packages. In such cases, the development object can be made visible to packages outside the nested structure if assignments are made at every level of the nested structure.

Use access for nested packages draws upon the previous discussion. Referring again to FIG. 4D, package P1 (139-1*a* and 139-2*a*) has implicit use access to package interface SS2 (402-1*b* and 402-2*b*) since package P1 directly contains package P2 (139-1*b* and 139-2*b*). In order for a package outside of P1 to be able to access objects inside of package P2, the outside package would need use access to package interface SS1 (402-1*a* and 402-2*a*), in addition to the visibility issues discussed above.

Figure 4E:
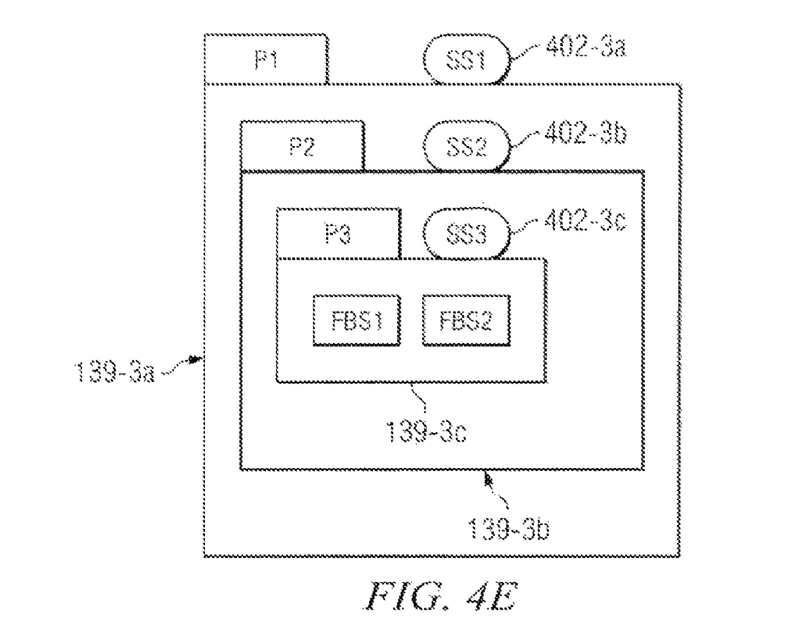

FIG. 4E shows an example package hierarchy that may be used in a particular implementation. In this example, the package comprises three layers, namely an outermost level in the package hierarchy is a "structure package" 139-3*a*, the second level is a "main package" 139-3*b*, and the third level is a "package" 139-3*c*. The package 139-3*c* contains the development objects to be used and may contain multiple nested levels. Indeed, these packages 139-3*c* may be contained in a "main package" 139-3*b*.

Main packages 139-3*b* in FIG. 4E define the highest package level directly below the structure package level 139-3*a*. They are usually only used for structuring purposes and, under normal circumstances, directly contain other packages 139-3*c* only, not development objects. In other words, main packages 139-3*b* usually contain development objects indirectly, via the packages 139-3*c* that the main packages 139-3*b* directly contain. Further, main packages 139-3*b* are generally not nested. In addition, main packages 139-3*b* may have package interfaces 402-3*b* that function as discussed above.

Structure packages 139-3*a*, the outermost packages in FIG. 4E, are usually used for structuring purposes. Like main packages 139-3*b*, structure packages 139-3*a* usually do not directly contain development objects. Instead, structure packages often contain other packages (such as main packages 139-3*b*) and thus indirectly contain development objects via the contained packages. Structure packages 139-3*a* are usually not nested. Further, structure packages 139-3*a* are normally transparent regarding visibility in that the package interfaces SS2 402-3*b* of main packages do not need to be propagated to the structure package level in order to be visible to outside packages or applications. In contrast to many ordinary packages 139-3*c* or main packages 139-3*b*, structure packages may also have special package interfaces SS1 402-3*a*, such as filter interfaces, shown in FIG. 4E.

Filter interfaces manage dependencies on the structure package level. They serve to define the decoupling relation between two structure packages and to specify an additional condition (allowed server object types) that is checked before objects of a package embedded in the server structure package may be used. In particular implementations, before objects of a package embedded in a server structure package may be accessed by a component of an outside structure package, the outside structure package should have use access to the filter interface of the server structure package.

Structure packages 139-3*a* may have other types of special package interfaces SS1 402-3*a* as well: virtual default package interfaces and/or default package interfaces. Virtual default package interfaces implicitly contain all objects of a structure package. Default package interfaces may contain exceptions objects, objects whose use is acceptable even if the client structure package does not have use access to a filter package interface of the server structure package.

Figure 5:
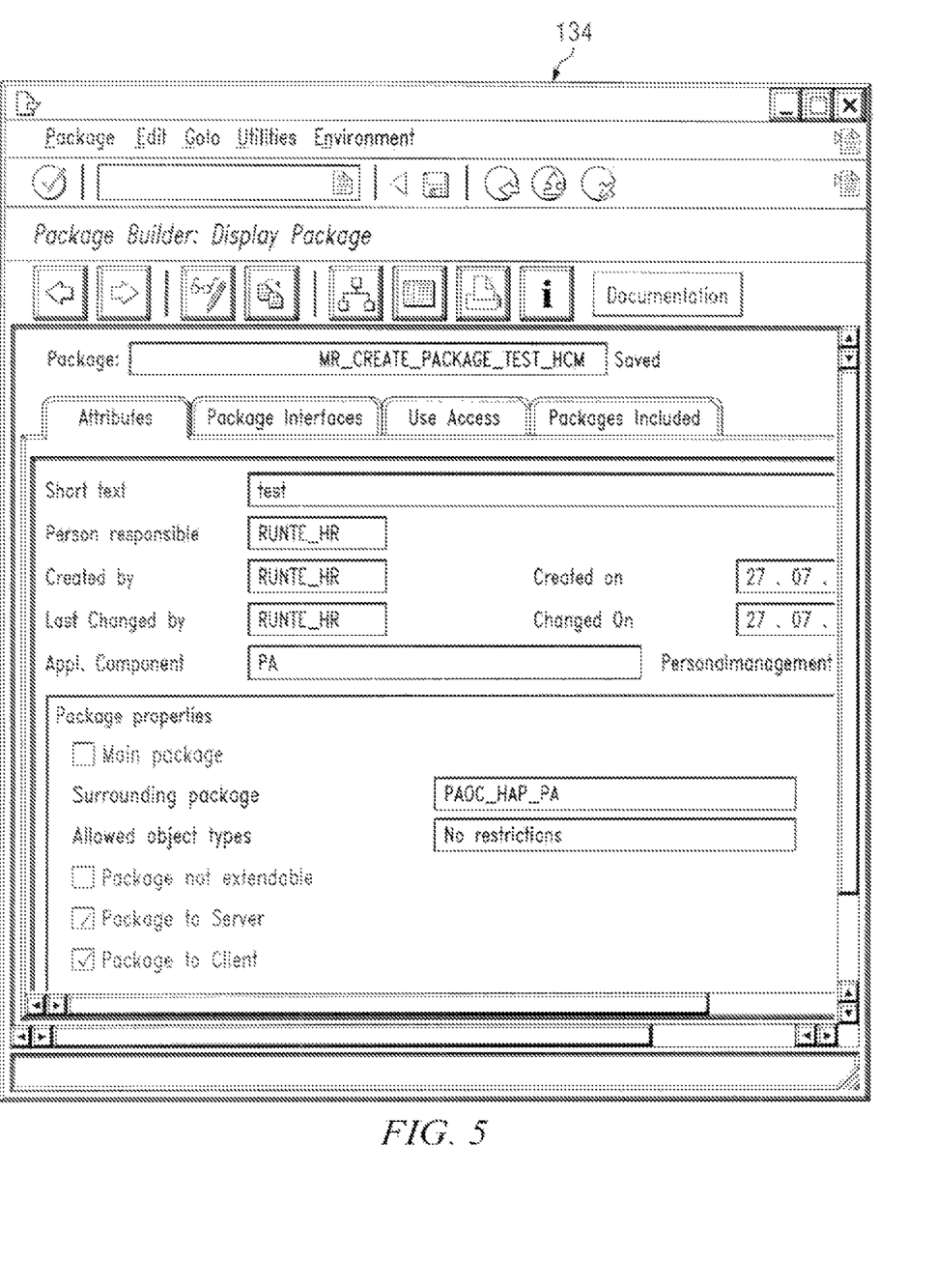
FIG. 5 illustrates an example interface through which the development of packages and package interfaces may take place.

FIG. 5 shows an example of a user interface 134 through which the development of packages and package interfaces may take place. As mentioned above, this interface may be a front-end for the respective development application 135. Tabs may exist for a variety of functions, including examining the attributes of a package, its package interfaces, its use accesses, and its included packages. Information could be provided concerning any main packages or structural packages enclosing the package, when the package was created or changed, and any other suitable information.

For example, an object "CORE" from package "SERVER" may be used in package "CLIENT" in the top Add On layer 302 for a new development of project "ADDON." This example object CORE is not part of the package interfaces in the upper stack layers 304 and 306 and is therefore not useable in this Add On layer 302. Moreover, these client packages do not have use access to object CORE. In this example, object CORE is not intended to be used by any packages other than CLIENT. It is also intended that the objects which are created in project ADDON will be moved back from the Add On layer 302 into the stack software layers 304 and 306 in one of the next releases after project ADDON is finished. The packages in the stack layers 304, 306, and 308 and Add On layer 302 are in a nested or other hierarchical package structure, namely structure package, main package, and package levels as shown below:

|                              | Naming Convention |
| --- | --- |
| Packages in Stack layers     |                   |
| Structure package            | SERVER_SP         |
| Main package                 | SERVER_MP         |
| Package                      | SERVER            |
| Object CORE                  |                   |
| Packages in Add On layer:    |                   |
| Structure package            | CLIENT_SP         |
| Main package                 | CLIENT_MP         |
| Package                      | CLIENT            |

It will be understood that the foregoing structures are meant for example purposes only and other packages with differing structures may be utilized and be within the scope of this disclosure. Returning to the example, system 100 may process the various packages utilizing techniques similar to that described in FIG. 6.

Figure 6:
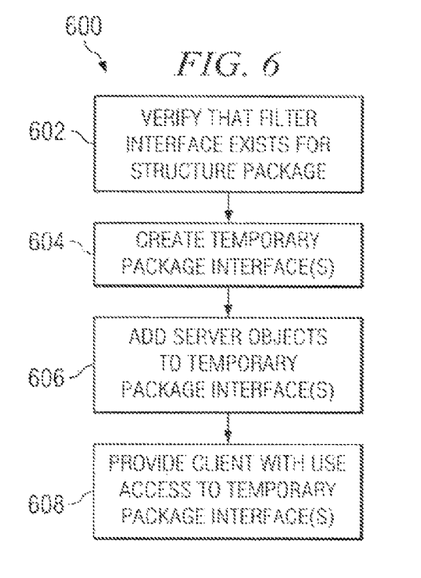
FIG. 6 illustrates an example method for solving errors that may occur when software packages attempt to access objects contained in other software packages.

FIG. 6 is a flowchart illustrating example method 600 for solving errors arising from insufficient use access of the client package in accordance with certain embodiments of the present disclosure. Generally, the following description focuses on the operation of development software, perhaps under the direction of a developer using GUI 134, to perform these methods in the example context discussed above of a package CLIENT attempting to access object CORE from package SERVER. But system 100 contemplates using any appropriate combination and arrangement of logical elements implementing some or all of the described functionality. Indeed, any suitable environment, system, or component may implement the following or other similar techniques.

Example method 600 begins at step 602, where the development software verifies that a so-called FILTER interface exists for structure package SERVER_SP. The terms "verifies" or "verifying" may include generating, requesting, automatically utilizing, or otherwise confirming that a package can communicate with another package; in certain embodiments of the present disclosure, these functions may occur upon authentication. Server structure package SERVER_SP may need to have a FILTER interface to manage dependencies on the structure package level. If a server structure package does not have a FILTER interface, it may not be possible to use any objects from the server structure package or its underlying packages; a FILTER interface may need to be created. Further, the development software should create the FILTER interface so that it will be permanently available. To do this, a common naming convention is helpful. An example of such a naming convention is _<name of structure package>_FILTER, or _SERVER_SP_FILTER in this example. In most cases the server structure package will already have a FILTER interface, in which case this step can then be skipped.

Yet even if development software provides a FILTER interface, this may not be sufficient to open the structure package to other packages since such features as object visibility, package interfaces, and use access may be required. Development software may need to create package interfaces for package SERVER and main package SERVER_MP in order for object CORE to be visible to outside packages. If so, an important question is whether the package interfaces should be temporary or permanent. Creating package interfaces exposes the contents of a (server) package to the outside, a situation that can lead to dependencies between the server and client packages. Since the objects from ADDON are intended to be moved back into the stack layers eventually, the contents of the package SERVER may be exposed only as long as necessary. Thus, temporary package interfaces should be created for packages SERVER and SERVER_MP by the development software, as done at step 604. The development software should delete these temporary package interfaces as soon as ADDON is retrofitted into the stack layers (such as 304, 306, and/or 308) since they would no longer be required and could create dependencies with other packages. This will help prevent other software packages from accessing the objects of the server packages; their attempted access would typically be denied. To be able to safely delete these interfaces after project ADDON has been retrofitted into the stack layers, it is important to know all of the clients of both package interfaces. This can be done if the development software restricted use of the package interfaces to certain consumer packages. As mentioned earlier, use restrictions, such as an "access control list," may be maintained directly in package interfaces. In the context of this example, the development software would place use restrictions in the temporary package interfaces for SERVER and SERVER_MP to restrict access to packages CLIENT and CLIENT_MP, making it much easier to subsequently delete these package interfaces.

In some circumstances, it may be useful to have a naming convention for the temporary package interfaces. In the foregoing example, the name of the temporary package interface for SERVER_MP to be used for project ADDON could be "IF_SERVER_MP_FOR_ADDON." Similarly, the name of the package interface for SERVER could be "IF_SERVER_FOR_ADDON." Second, system 100 may utilize permanent—rather than temporary—package interfaces. For example, project ADDON may stay in the Add-On layer 302 permanently rather than being retrofitted into the stack layers 304, 306, and/or 308, in which case it perhaps makes sense to reuse existing package interfaces since the new dependencies of ADDON will remain there as long as ADDON is in the Add-on layer 302 (possibly permanently). In addition, if it is known ahead of time how the completed project ADDON will be retrofitted into the stack layers, then the development software may use permanent package interfaces.

Once the development software creates the temporary package interfaces, the development software undergoes the process of adding server objects to temporary package interfaces, shown at step 606. In this example, the development software adds the objects that project ADDON seeks to access to the temporary package interface IF_SERVER_FOR_ADDON of package SERVER. Next, the development software adds the temporary package interface IF_SERVER_FOR_ADDON itself to the temporary package interface IF_SERVER_MP_FOR_ADDON of main package SERVER_MP. As a result of this procedure, the server packages now offer the object CORE to the outside. In other words, CORE has been made visible to the client packages.

Because visibility alone may not be sufficient for client packages to access object CORE, the development software may provide the client packages with use access, as in step 608. First, the development software gives client structure package CLIENT_SP use access to the filter interface of the server structure package _SERVER_SP_FILTER. Second, the development software provides the client main package CLIENT_MP use access to the server main package's temporary package interface IF_SERVER_MP_FOR_ADDON. Third, the development software gives client package CLIENT use access to the server main package's temporary package interface IF_SERVER_MP_FOR_ADDON.

At this point, the original error is now corrected; the client package CLIENT can access the object CORE. Upon completion of development project ADDON, the client packages and ADDON can be moved to the stack layers (such as 304, 306, and/or 308). After this move, it is likely that the client and server packages will now be in the same software component. Indeed, the client package would likely now be in the same structure package as the server package or within the server package. If the client package is within the server package, access of the client package to CORE will be automatic (since CORE is also in the server package), and the client packages will no longer need the temporary package interfaces. Because of the access control list or other use restrictions, one can also be confident that no other packages will need access to the object CORE via the temporary package interfaces. Thus, one will be able to safely delete the temporary package interfaces IF_SERVER_MP_FOR_ADDON and IF_SERVER_FOR_ADDON. In the event that the client package is not within the server package, but rather within the same main package as the server package (so that the client and server packages are at the same level), then the client package would still need access to the object CORE. In this case, object CORE could be added to an existing package interface of the server package, or a permanent package interface could be created.

The preceding flowchart and accompanying description illustrates exemplary method 600. But system 100 contemplates using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate. For example, it will be understood that the client may execute portions of the processes described in method 600 in parallel or in sequence.

In some cases, the exigencies of software development may be such that quicker, temporary solutions are utilized. Accordingly, system 100 may, alternatively or in combination, utilize various other techniques based on various factors. For example, development application 135 may simply ignore the access errors, though it could potentially lead to consequences and make error monitoring more difficult by masking other types of errors. In another example, a support package (or some other transport of development objects between two internal systems) might be transported from the stack layers 304, 306, and 308 to the Add-On layer 302 upon request or identification of potential utilization. For example, such support packages might only contain corrections to package interfaces.

Although this disclosure has been described in terms of certain embodiments and generally associated methods, alterations and permutations of these embodiments and methods will be apparent to those skilled in the art. For example, each software or development package may contain zero, one, two, or any other appropriate number of child, parent, or nested packages. Accordingly, the above description of example embodiments does not define or constrain this disclosure. Other changes, substitutions, and alterations are also possible without departing from the spirit and scope of this disclosure.

What is claimed is:

1. Software for managing hierarchical software development comprising machine-readable instructions stored on media, the software operable when executed to:
    identify a first software package of a first software layer that is associated with a second software package of a second software layer, wherein the first software package and the second software package contain nested levels, wherein the nested levels include a first level, a second level, and a third level, and wherein a first level of the second software package is associated with a filter interface for managing object dependencies of the first level of the second software package; and
    create a first temporary package interface for a second level of the second software package and a second temporary package interface for a third level of the second software package, the first and second temporary package interfaces allowing the first software package to access at least one object within the second software package.

2. The software of claim 1 further operable to delete the first and second temporary package interfaces after the first software package has been moved from the first software layer to a different software layer.

3. The software of claim 2, further operable to deny a third software package seeking access to the at least one object within the second software package after the first and second temporary package interfaces have been deleted.

4. The software of claim 1, wherein the at least one object within the second software package may be accessed by the first software package if the at least one object has been assigned to the first or second temporary package interface for the second package.

5. The software of claim 4, the second temporary package interface operable to authenticate the first software package prior to allowing the first software package to access the at least one object.

6. The software of claim 5, the second temporary interface denying a third software package access to the at least one object within the second software package after failed authentication.

7. The software of claim 5, the second temporary package interface authenticating the first software package using an access control list.

8. The software of claim 7, wherein the access control list is maintained in the second temporary package interface.

9. The software of claim 1, wherein the at least one object within the second software package is contained in the third level of the second software package.

10. The software of claim 9, wherein the objects contained in the third level are assigned to the second temporary package interface of the third level of the second software package, after which the second temporary package interface of the third level of the second software package is assigned to the first temporary package interface of the second level of the second software package.

11. The software of claim 10, the first temporary package interface of the second level of the second software package operable to authenticate the first software package prior to allowing the first software package to access the at least one object.

12. The software of claim 11 further operable to delete at least one of the second temporary package interface of the third level of the second software package, the first temporary package interface of the second level of the second software package, and the filter interface of the first level of the second software package, after the first software package has been moved from the first software layer to a different software layer.

13. A computer implemented method performed by at least one processor for managing hierarchical software development, the method comprising the following operations:
    identify a first software package of a first software layer that is associated with a second software package of a second software layer, wherein the first software package and the second software package contain nested levels, and wherein the nested levels include a first level, a second level, and a third level, wherein a first level of the second software package is associated with a filter interface for managing object dependencies of the first level of the second software package; and create a first temporary package interface for a second level of the second software package and a second temporary package interface for a third level of the second software package, the first and second temporary package interfaces allowing the first software package to access at least one object within the second software package.

14. The method of claim 13, wherein the at least one object within the second software package is contained in the third level of the second software package.

15. The method of claim 14, wherein the objects contained in the third level are assigned to the second temporary package interface of the third level of the second software package, after which the second temporary package interface of the third level of the second software package is assigned to the first temporary package interface of the second level of the second software package.

16. The method of claim 15, the first temporary package interface of the second level of the second software package operable to authenticate the first software package prior to allowing the first software package to access the at least one object.

17. The method of claim 16, the at least one processor further operable to delete at least one of the second temporary package interface of the third level of the second software package, the first temporary package interface of the second level of the second software package, and the filter interface of the first level of the second software package, after the first software package has been moved from the first software layer to a different software layer.

18. A system, comprising:

memory operable to store at least a first and second software package; and at least one processor operable to:

identify a first software package of a first software layer that is associated with a second software package of a second software layer, wherein the first software package and the second software package contain nested levels, wherein the nested levels include a first level, a second level, and a third level, and wherein a first level of the second software package is associated with a filter interface for managing object dependencies of the first level of the second software package; and create a first temporary package interface for a second level of the second software package and a second temporary package interface for a third level of the second software package, the first and second temporary package interfaces allowing the first software package to access at least one object within the second software package.

19. The system of claim 18, wherein the at least one object within the second software package is contained in the third level of the second software package, wherein the objects contained in the third level are assigned to the second temporary package interface of the third level of the second software package, after which the second temporary package interface of the third level of the second software package is assigned to the first temporary package interface of the second level of the second software package.

20. The system of claim 19, the first temporary package interface of the second level of the second software package operable to authenticate the first software package prior to allowing the first software package to access the at least one object.

21. The system of claim 20, the second temporary interface denying a third software package access to the at least one object within the second software package after failed authentication.

* * * * *